US007236269B2

(12) United States Patent
Donovan et al.

(10) Patent No.: US 7,236,269 B2
(45) Date of Patent: Jun. 26, 2007

(54) SYSTEM AND METHOD FOR DITHERING WITH REDUCED MEMORY

(75) Inventors: Timothy J. Donovan, Livermore, CA (US); Dung Nguyen, San Jose, CA (US); Meng Long, Milpitas, CA (US)

(73) Assignee: Chrontel, Inc., San Jose, CA (US)

( * ) Notice: Subject to any disclaimer, the term of this patent is extended or adjusted under 35 U.S.C. 154(b) by 970 days.

(21) Appl. No.: 10/288,781

(22) Filed: Nov. 5, 2002

(65) Prior Publication Data

US 2003/0122847 A1 Jul. 3, 2003

Related U.S. Application Data

(60) Provisional application No. 60/332,914, filed on Nov. 5, 2001.

(51) Int. Cl.
*H04N 1/405* (2006.01)

(52) U.S. Cl. .................................... 358/3.22; 358/3.05

(58) Field of Classification Search ...... 358/3.21–3.22, 358/3.03–3.06, 3.14–3.15, 3.01, 1.9, 2.1
See application file for complete search history.

(56) References Cited

U.S. PATENT DOCUMENTS 5,122,884 A * 6/1992 Gilbert et al. ............ 358/3.15
7,081,972 B2 * 7/2006 Fukao ...................... 358/3.04

* cited by examiner

*Primary Examiner*—Thomas D. Lee

*Assistant Examiner*—Stephen Brinich

(74) *Attorney, Agent, or Firm*—Perkins Coie LLP

(57) ABSTRACT

A dithering system yielding two-dimensional dither functioning is implemented without line memories. For each primary input color, a feedback loop outputs an color input signal plus error that can be preset to different values. The desired result is that vertical artifacts on a display formed from the output signals are relocated to different locations on consecutive display lines. If signal magnitude from the feedback loop output exceeds the magnitude of the video system creating the display, signal magnitude is preset to a value representing error at the start of the display line.

22 Claims, 1 Drawing Sheet

SYSTEM AND METHOD FOR DITHERING WITH REDUCED MEMORY

PRIORITY CLAIM

Priority is claimed from now abandoned U.S. provisional patent application Ser. No. 60/332,914 filed on Nov. 5, 2001 entitled "System and Method for Dithering with Reduced Memory".

FIELD OF THE INVENTION

The invention relates generally to processing video images and more particularly to modifying image pixel values using a dithering process.

BACKGROUND OF THE INVENTION

Many graphic and video displays in use receive an input digital data stream (which may be a digitized analog data stream) that is used to modulate output light intensity, for example in LCD laptop computer displays, and desktop flat panel displays. Typically three channels of data are used to create the display: red, green, and blue primaries, from which a wide spectrum of visible light can be created. More specifically, the display is represented by pixels (picture elements), where each pixel is represented by three colors (red, blue, green), and each color has eight bits of information.

Thus, it is known that to represent images with photo-realistic quality requires at least eight bits of information per color per display pixel. But for reasons that include cost, many LCD displays are manufactured that can accept only fewer than eight bits per color, perhaps only six bits or even fewer bits.

Using fewer than eight bits per color creates an image artifact known as quantizing. This undesired effect is especially noticeable in display areas of gradual change in the image. Although a smooth transition in display output intensity should be presented, the quantized image instead exhibits large jumps in output intensity. The term "quantization error" will be used herein to refer to the difference between a display image represented with eight bits per color and a display image represented with fewer than eight bits per color.

It is known in the art to reduce visibility of the quantization error by storing the difference between eight bit per color pixel values and the quantized image pixel values, and by modifying the quantized image pixel values based on such pixel error. The goal, not always attained, is to create an error pattern that is less visibly noticeable to the human eye. This process of modifying the pixel values is commonly referred to as "dithering" the image.

Representing an image with fewer bits per pixel than the original source data began with development of algorithms intended to enable black and white line printers to make a reasonable representation of photographic and computer generated images. Understandably such printers could only display one bit per pixel, e.g., black or white. Prior art methods beginning with that published in 1976 by Floyd and Steinberg sought to disperse the error between the displayed (or printed) pixel value and the original pixel value to neighboring pixels. This was done by adding the accumulated error from previous pixels to the value of the current pixel before quantizing the current pixel. After quantization, a new error signal (the difference between what was displayed for that pixel and the original pixel value plus incoming error) was applied to the following pixels in a manner intended to make the viewable error less noticeable. How to propagate the accumulated error signal differentiate various dither algorithms from each other.

Typically the error was propagated in two dimensions, using a two-dimensional mask or filter function. In video systems images are displayed on a screen sequentially from left to right, and top to bottom. Thus, propagating the error occurs in the horizontal direction to the right (as the user views the screen) and in the vertical direction downward. Understandably this requires some memory to store a portion of the error signal for use on display lines following the current display line. The need to propagate a portion of the error signal in the vertical direction arises mainly from artifacts generated by the dither process.

Generally, if dither is applied in the horizontal direction only, and an image is displayed in which successive lines are similar, the dither artifact will repeat in the same location on every line. This type of artifact is easily noticeable to the human eye, and appears as an error in the displayed image.

What is needed then is a system and method for dithering image data that preferably requires less memory than existing dithering.

The present invention provides such a method and system for dithering.

SUMMARY OF THE INVENTION

The present invention achieves the benefits of two-dimensional dither performance, but without requiring line memory. In one embodiment, vertical artifacts are broken-up and the artifact positions on a display are relocated to different locations on consecutive display lines. For each primary color (red, blue, green) the present invention creates a feedback loop by forming an input signal plus error. This error signal is then bit-limited, e.g., to 255, and the two least significant bits (LSB's) of the eight-bit wide limited signal are coupled to a delay flip-flop.

In contrast to prior art approaches that require a line memory to store vertical components of error signals, the present invention eliminates such memory and preferably presets the error signal to different values on consecutive display lines prior to the active video. So doing advantageously breaks-up the position of vertical artifact. Preferably if the magnitude of the input signal plus error exceeds the dynamic range of the video system, the present invention presets the error for each color as the error was as the start of the display line. In this fashion artifact error is avoided by repositioning, even if magnitude of the input signal plus error is a maximum value. The resultant dither function achieves two dimensional dither performance even with maximum magnitude error, without the use of line memories.

Other features and advantages of the invention will appear from the following description in which the preferred embodiments have been set forth in detail, in conjunction with the accompanying drawing.

DETAILED DESCRIPTION OF THE PREFERRED EMBODIMENTS

Figure 1:
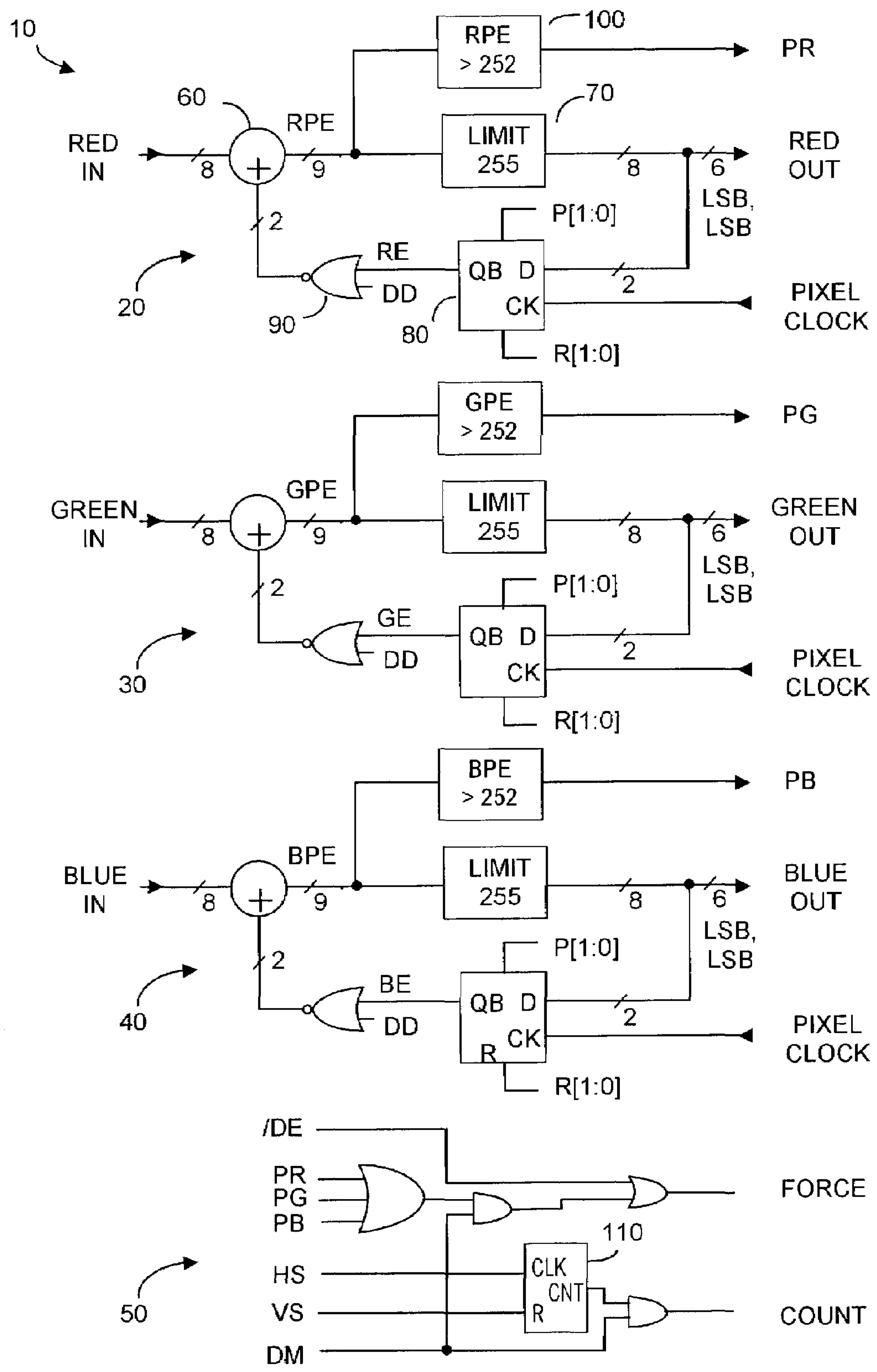
FIG. 1 depicts an exemplary system to implement dithering with reduced memory, according to the present invention.

The present invention provides an algorithm to implement a dither process that reduces the level of artifact comparable to what is present in a two dimensional system. Advantageously, the present invention can accomplish this without use of a line memory to store the vertical component of the error signal. Table 1, below, provides signal name definitions that are useful in understanding the present invention, especially in conjunction with FIG. 1.

It is desired to remove the vertical artifact from the one dimensional dither function. As described earlier, undesirable vertical artifact generated by the one dimensional dither function can be avoided by splitting the error signal into two components. A first of the two components is added to the next pixel on the same line, and the second of the two components is added to the same pixel on the next line. This procedure has the effect of shifting the quantization error to a different location on consecutive lines. Although this known technique reduces visible artifact error, implementation requires a line memory to store the vertical component of the error signal. A challenge then is to reduce visible artifact error but without requiring use of a line memory.

TABLE 1

| Signal Name | Definition | Signal Name | Definition | Signal Name | Definition |
|---|---|---|---|---|---|
| Red In | Red input pixels | Green In | Green input pixels | Blue In | Blue input pixels |
| RPE | Red plus Error | GPE | Green plus Error | BPE | Blus plus Error |
| PR | Preset due to Red overflow | PG | Preset due to Green overflow | PB | Preset due to Blue overflow |
| RE | Red Error signal | GE | Green Error signal | BE | Blue Error signal |
| Red Out | Red Output pixels | Green Out | Green Output pixels | Blue Out | Blue Output pixels |
| DD | Dither Defeat | /DE | Data Enable (low during active data) | Force | Force a preset or reset to error latch |
| Count | Modulo 2 line counter | DM | Dither Mode | | |
| VS | Vertical Sync | HS | Horizontal Sync | | |

Referring now to FIG. 1, as a first step, procedurally the present invention 10 preferably generates a one dimensional dither function that can accept input pixels comprising three color primaries: Red In, Green In and Blue In. Preferably each of these inputs is eight-bits wide (e.g., 24-bit color depth). As described herein, the present invention can limit the output pixels (Red Out, Green Out and Blue Out) to six-bits wide each (18-bit color depth). For each of the Red In—Red Out, Green In—Green Out, Blue In—Blue Out functions, similar circuits shown as 20, 30, and 40 are provided by system 10. A logic unit 50 also interfaces with system 10.

The present invention creates a feedback loop for each color primary (Red In, Green In and Blue In) by forming an input signal plus error (RPE, GPE and BPE for red, green, blue colors respectively). Using the Red In—Red Out circuit 20 as an example, RPE is formed using a summer 60 that receives the Red In input signal and a fedback version of the Red Out output signal. The signal that results from the input plus error is preferably limited, for example, to 255, for example by limiter 70. The eight-bit wide limited signal is limited to six-bit width and is stored, preferably by storing the two least significant bits (LSB's) of the eight-bit wide signal. The LSBs (shown in FIG. 1 as LSB, LSB) may be clocked into a D-type flipflop 80 whose output is then passed through logic gate 90 and into summer 60. Thus in a preferred embodiment, the stored information gives a maximum value of three. If the magnitude of RPE exceeds a threshold, e.g., 252, RPE unit 100 passes a preset PR signal to logic unit 50.

If the two LSB's were delayed by one system clock cycle and added to the next set of input signals, the result would be similar to a prior art one dimensional dither function. However the present invention modifies the above procedure somewhat to achieve results comparable to a two dimensional dither function.

Thus, one embodiment of the present invention includes breaking up the vertical artifact and relocating the position of the artifacts to different locations on consecutive lines by presetting the error signal to different values on consecutive lines prior to generating the active video. Presetting the error to different values at the start of each video line, and then accumulating the error pixel-by-pixel results in different error at vertically adjacent display pixels. The desired result is to implement two-dimensional dither performance in which visible artifact error is reduced. However this artifact reduction is attained without using a line memory, in contrast to the prior art implementation described above and earlier herein. In one embodiment, if the magnitude of the input signal plus error exceeds a magnitude determined by the system dynamic range, then the error for that color is preset to the value it had at the beginning of the line of video. Were this not done, then vertically adjacent pixels could undesirably exhibit the same error signal (e.g., maximum signal tolerated by the system), with resultant visible artifact.

Referring to logic system 50 in FIG. 1, the present invention preferably uses a 2-bit counter 110 clocked with each horizontal line, which develops the signal Count. At the start of each line prior to active video (when the /DE signal is high), the Force and Count signals cause the latches holding the error values to be preset/reset to a value that changes display line to line. This has the effect of changing the horizontal direction location whereat the error signal will create an observable artifact in the image.

Table 2 below shows the operation of logic unit 50 and provides exemplary reset data.

TABLE 2

| Force | Count | P[1:0] | R[1:0] | Comment |
|---|---|---|---|---|
| 0 | x | 00 | 00 | no Preset or Reset |
| 1 | 00 | 11 | 00 | Error registers set to 3 |
| 1 | 01 | 01 | 10 | Error registers set to 1 |
| 1 | 10 | 10 | 01 | Error registers set to 2 |
| 1 | 11 | 00 | 11 | Error registers set to 0 |

In the operation of logic unit 50, it is assumed that all arithmetic operations are unsigned. With respect to the register control values, DD denotes Dither Defeat, and DM denotes enabled Dither Mode.

However the effect resulting from presetting the error signal to different values on each line may be lost due to some input signal conditions. For example, if the input signal plus error exceeds the dynamic range of the system, all error signals will be set to their maximum value. If this occurs in the same location in consecutive lines, and later pixels in the same line are below this maximum value, then the error signals in consecutive lines will no longer be different from one another. This has the effect of canceling the error signal preset that was performed at the start of each line.

To avoid this undesired result, the present invention preferably compares each input signal plus error to a level that is near maximum, e.g., 252 as tested by unit 100. If this level is exceeded, then the error signal latches are again preset, as they were at the start of each line. For example, the latches holding the error signal are preferably preset at the start of each line, and may be subsequently preset if the error signal exceeds a threshold, for example, >252.

In short, the present inventions successfully implements a dither function that achieves two dimensional dither performance without the use of line memories.

Modifications and variations may be made to the disclosed embodiments without departing from the subject and spirit of the invention as defined by the following claims.

What is claimed is:

1. A method to dither an image representable by lines of clockable 24-bit pixels, each of said pixels represented as red, green, and blue primary color signals using 8-bits of information, the method comprising the following steps:

(a) for each of said 8-bit wide red, green, and blue color signals, defining an error signal based upon less than 8-bit width color representation; and (b) for each of said red, green, and blue color signals, presetting said error signal to different values for different said lines comprising said image; and (c) generating said image lines so that a vertical artifact in an image formed from said colors using said different preset error for said different lines will appear at a different location on at least a plurality of adjacent lines of said image.

2. The method of claim 1, further including:

if magnitude of any of said 8-bit wide color signals plus said error at step (b) exceeds a threshold associated with a system displaying said image, presetting said error to magnitude of said error at the start of a line of said image;

wherein vertical artifact in an image formed from said colors is reduced even if said magnitude at step (b) is large.

3. The method of claim 1, further including:

(d) for each of said colors, feeding back said error signal defined at step (a) to generate a sum of said 8-bit wide color and said error signal;

(e) for each of said red, green, and blue colors, bit-limiting said sum generated at step (d); and (f) outputting as red, green, and blue color data bit-limited sums created at step (e);

wherein an image formed from color data output at step (f) exhibits reduced quantization error.

4. The method of claim 1, wherein for each of said red, green, and blue colors, at step (a) said less than 8-bit width color representation is 6-bit width color representation.

5. The method of claim 1, wherein for each of said red, green, and blue colors, at step (a), said less than 8-bit width color representation is 6-bit width color representation, and said error signal is defined as two least significant bits (LSB) of said 8-bit width color representation.

6. The method of claim 3, wherein at step (d) each of said sums is limited in magnitude to $2^8-1$.

7. The method of claim 3, wherein at step (f) each of said bit-limited sums is limited to 6-bit width.

8. The method of claim 2, wherein said threshold has magnitude 252.

9. A method to dither an image representable by clockable 8-bit wide red, green, and blue color signals, the method comprising the following steps:

(a) for each of said 8-bit wide red, green, and blue color signals generating a one-dimensional dither function having less than 8-bit color width;

(b) for each 8-bit wide red, green, and blue color signals, using feedback to generate an error signal based upon bit-limiting said color signals to less than 8-bit width;

(c) if magnitude of one of said 8-bit wide color signals plus said error at step (b) exceeds a threshold associated with a system displaying said image, presetting said error to magnitude of said error at the start of a line of said image; and (d) generating a plurality of adjacent lines of said image to realize a two-dimensional dither function in which any vertical artifacts in the image formed from said colors is reduced even if said magnitude at step (c) is large.

10. The method of claim 9, wherein at step (b), for each of said red, green, and blue color signals, said less than 8-bit width is 6-bit width.

11. A system to dither an image representable by lines of clockable 24-bit pixels, each of said pixels represented as red, green, and blue primary color signals using 8-bits of information, the system comprising:

for each of said 8-bit wide red, green, and blue color signals, means for generating an output signal comprising one of said 8-bit wide color signals plus an error signal based upon less than 8-bit wide color representation;

means for presetting magnitude of each said output signal to different values for different said lines comprising said image; and means for generating said image lines so that a vertical artifact in an image formed from said colors using said different preset error for said different lines will appear at a different location on at least a plurality of adjacent lines of said image.

12. The system of claim 11, further including:

means for presetting said magnitude of a set output signal to a magnitude representing output at the start of a line of said image when said output signal magnitude exceeds a threshold associated with a system displaying said image;

wherein vertical artifact in an image formed from said colors is reduced even if magnitude of said error is large.

13. The system of claim 11, further including:

a feedback sub-system for each of said red, green, and blue colors in which said error signal is fed-back to generate a sum of said 8-bit wide colors and said error signal;

for each of said red, green, and blue pixels, a bit-limiter coupled to limit each said sum generated by said feedback sub-system;

wherein an image formed from color data output from each said bit-limiter exhibits reduced quantization error.

14. The system of claim 11, wherein for each of said red, green, and blue colors, said less than 8-bit wide color representation is 6-bit width.

15. The system of claim 11, wherein for each of said red, green, and blue colors, said means for generating an output signal defines said output signal as two least significant bits (LSB) of said 8-bit width color representation.

16. The system of claim 13, wherein said bit limiter limits each of said sums in magnitude to $2^8-1$.

17. The system of claim 13, wherein said bit limiter limits color data output to 6-bit width.

18. The system of claim 12, wherein said threshold has magnitude 252.

19. A system to dither an image representable by lines of clockable 24-bit pixels, each of said pixels represented as red, green, and blue primary color signals using 8-bits of information, the system comprising:

for each of said 8-bit wide red, green, and blue color signals, means for generating an error signal based upon less than 8-bit wide color representation;

for each of said 8-bit wide red, green, and blue color signals, means for presetting said error signal to different values for different said lines comprising said image;

means for presetting said error signal at a start of a line of said image to a magnitude representing error if any of said 8-bit wide color signals plus said error exceeds a threshold magnitude associated with said system; and means for generating said image lines so that a wherein vertical artifact in an image formed from said colors using said different preset error for said different lines will appear at a different location on at least a plurality of adjacent lines of said image.

20. The system of claim 19, further including:

a feedback sub-system for each of said red, green, and blue color signals, in which said error signal is fed-back to generate a sum of an 8-bit wide color signal and said error signal; and for each of said red, green, and blue pixels, a bit-limiter coupled to limits each said sum generated by said feedback sub-system.

21. A method for dithering at least a portion of an image representable by lines of clockable 24-bit pixels, each of said pixels represented as red, green, and blue primary color signals using 8-bits of information, the method comprising the steps:

(a) for each of said 8-bit wide red, green, and blue color signals, defining an error signal based upon less than 8-bit width color representation;

(b) for each of said red, green, and blue color signals, presetting said error signal to different values for different said lines comprising said image;

(c) generating plurality of adjacent lines so that any vertical artifacts in an image formed from said colors that occur in said plurality of adjacent lines will appear at a different location in said at least two adjacent lines of said image;

(d) if magnitude of any of said 8-bit wide color signals plus said error at step (b) exceeds a threshold associated with a system displaying said image, presetting said error to magnitude of said error at the start of a line of said image so that any vertical artifact in an image formed from said colors is reduced even if said magnitude at step (b) is large;

(e) for each of said colors, feeding back said error signal defined at step (a) to generate a sum of said 8-bit wide color and said error signal;

(f) for each of said red, green, and blue colors, bit-limiting said sum generated at step (c); and (g) outputting as red, green, and blue color data bit-limited sums created at step (f) so that an image formed from color data output at step (e) exhibits reduced quantization error.

22. A system to dither an image representable by lines of clockable 24-bit pixels, each of said pixels represented as red, green, and blue primary color signals using 8-bits of information, the system comprising:

for each of said 8-bit wide red, green, and blue color signals, means for generating an error signal based upon less than 8-bit wide color representation;

for each of said 8-bit wide red, green, and blue color signals, means for presetting said error signal to different values for different said lines comprising said image;

at least one circuit for presetting said error signal to a magnitude representing error at a start of a line of said image if any of said 8-bit wide color signals plus said error exceeds a threshold magnitude associated with said system; and at least one circuit for generating a plurality of adjacent lines of said image using said different values of preset magnitude in said different lines so that any vertical artifacts in an image formed from said colors signals that occur in said plurality of adjacent lines will appear at a different location in said plurality of adjacent lines of said image.

* * * * *